3,824,125
SOIL RELEASE COMPOSITION

Everett H. Hinton, Jr., Raleigh, N.C., and Larry E. Avery, Cheraw, S.C., assignors to Burlington Industries, Inc., Greensboro, N.C.
No Drawing. Continuation-in-part of application Ser. No. 747,473, July 25, 1968, now Patent No. 3,650,801. This application July 28, 1971, Ser. No. 176,368
The portion of the term of the patent subsequent to Mar. 21, 1989, has been disclaimed
Int. Cl. D06m *15/36*
U.S. Cl. 117—138.8 F                      14 Claims

ABSTRACT OF THE DISCLOSURE

Two hydrophilic acrylic polymers, preferably together with a higher trialkyl trimellitate, are employed in the washing of textiles in a laundry to improve the soil release properties. If desired a durable press resin can also be incorporated.

---

This application is a continuation-in-part of application 747,473 filed July 25, 1968 now Pat. 3,650,801.

The present invention is directed to the laundering of textiles by washing them in an aqueous dispersion including two hydrophilic acrylic polymers, preferably together with a higher trialkyl trimellitate to improve the soil release properties.

It is well known that oil- or grease-borne stains in fabrics composed of synthetic fiber, e.g., polyester fibers, are difficult to remove by laundering, due in at least some measure to the hydrophobic nature of the fibers. Oil-borne stains can usually be removed by dry cleaning but this is expensive and undesirable, particularly since an important advantage of fabrics containing synthetic fibers is that they retain their shape through laundering and need little, if any, ironing.

Illustrative of such stain causing substances are salad oils, motor oils, butter, margarine, coffee, cocoa, corn oil, gravy, lipstick, hair oil, salad dressings, catsup, mustard, cranberry juice, grape juice, grass stains and the like.

Normal laundering, in many cases, does not remove stains containing oily substances and/or coloring matter.

It has now been found that improved soil release properties can be obtained in laundering or washing textile fabrics in aqueous medium by including in the washing composition a hydrophilic water-swellable, emulsifiable copolymer and a water soluble polymer and preferably also a higher trialkyl trimellitate. If durable properties are desired to be imparted to the fabric there can be incorporated any of the conventional durable press textiles reactants such as formaldehyde, water soluble precondensates of formaldehyde with amino compounds and blocked isocyanates. Examples of such durable press reactants are methylol imidazolidone, water soluble precondensates of formaldehyde with urea, cyclic ethylene urea, melamine and other triazines, ethyl carbamate, urons, and triazones. Examples of precondensates are dimethylol cyclic ethylene urea and dimethylol dihydroxy cyclic ethylene urea. Suitable examples of such durable press reactants are set forth in Swidler Pat. 3,521,993, the entire disclosure of which is incorporated herein by reference.

It should be emphasized, however, that there is no need to employ a durable press reactant and preferably, such reactants are omitted.

Desirably, there is included a small amount of a nonionic wetting agent, e.g., Antifoam NS which is a nonionic wetting agent. However, the nonionic wetting agent can be omitted.

As the hydrophilic water-insoluble, water-swellable copolymer there is preferably employed a 60/40 copolymer of methacrylic acid and ethyl acrylate (MAA/EA) having a molecular weight of 800,000 to 1,500,000. However, other copolymers can be used such as a 65/35 copolymer MAA/EA as well as other MAA/EA copolymers having a MAA/EA ratio from 25:75 to 75:25. The molecular weights of such copolymers can range from 500,000 to 1,500,000.

The water soluble polymer is polyacrylic acid (AA), e.g., Goodrich K-702 (which is supplied as a 25% solution in water).

Both the water-swellable and water-soluble hydrophilic polymers are conventional.

The preferred higher trialkyl trimethllitate is triisodecyl trimellitate. Other trimellitates include trioctyl trimellitate, tris(2-ethylhexyl) trimellitate, triisoctyl trimellitate, tris decyl trimellitate and trihexadecyl trimellitate.

When a durable press resin is employed there also is used a conventional acid catalyst such as ammonium chloride, tartrate, formate, oxalate or nitrate, magnesium chloride or nitrate, zinc chloride or nitrate, amine hydrochlorides such as 2-amino-2-methyl-1-propanol hydrochloride, triethanolamine hydrochloride, ammonium dihydrogen phosphate, ammonium ethyl phosphate, etc.

The proportions of materials can be varied considerably. Thus in 50 gallons of aqueous mixture there can be used MAA/EA (as a 20% aqueous emulsion) 10 to 40 pounds (2 to 8 pounds on a dry basis)
AA (as a 25% aqueous solution) 4 to 16 pounds (1 to 4 pounds on a dry basis)
higher trialkyl trimellitate, 4 to 16 pounds (as a 50% suspension in water) (2 to 8 pounds on a dry basis)

The trimellitate can be omitted although it is preferably included since better soil relase properties are obtained when it is present.

When a durable press textile reactant is employed it is used in an amount of 7.5 to 30 pounds (dry basis), while the catalyst when employed is used in an amount of 0.5 to 6 pounds.

The soil release compositions of the present invention can be used with any fabrics, e.g. rayon, nylon, polyacrylonitrile or wool but are preefrably employed with cotton, polyester, e.g., polyethylene terephthalate (Dacron), polyethylene terephthalate-isophthalate, polymeric ester of cyclohexandimethanol and terephthalic acid (Kodel) and polyester-cotton blends, e.g., 65% Dacron-35% cotton.

The soil release compositions can be employed in washing fabrics such as clothes, e.g., shirts, socks, shorts, hose, underwear, slips, panty hose, bras, dresses and pants, work clothes, towels, wash cloths, napkins, sheets, pillow cases and the like.

Unless otherwise indicated all parts and percentages are by weight.

Any of the following formulations, when applied to textiles in the laundry wash water in the rinse cycle gave good soil release in the first wash action.

FORMULATION A

|  | Lbs. |
|---|---|
| MAA/EA 60/40 (as a 20% aqueous emulsion) | 20 |
| AA (25% solution in water) | 8 |
| N,N'-dimethyloldihydroxyethylene urea (45% solution in water) | 30 |
| Ammonium chloride (25% aqueous solution) | 3 |
| Triisodecyl trimellitate (50% suspension in water) | 8 |
| Antifoam NS | 0.2 |

Sufficient water was added to make 50 gallons.

FORMULATION B

| | Lbs. |
|---|---|
| MAA/EA 60/40 (as a 20% aqueous emulsion) | 20 |
| AA (25% solution in water) | 8 |
| Triisodecyl trimellitate (50% suspension in water) | 8 |
| Antifoam NS | 0.2 |

Sufficient water was added to make 50 gallons.

FORMULATION C

| | Lbs. |
|---|---|
| MAA/EA 60/40 (as a 20% aqueous emulsion) | 20 |
| AA (25% solution in water) | 8 |
| Triisodecyl trimellitate (50% suspension in water) | 8 |

Sufficient water was added to make 50 gallons.

FORMULATION D

| | Lbs. |
|---|---|
| MAA/EA 60/40 (as a 20% aqueous emulsion) | 20 |
| AA (25% solution in water) | 8 |

Formation D gave improved soil release although not as good as Formulation C.

In Examples A through E below the MAA/EA emulsion had 20% solids, the AA solution had 25% solids and the triisodecyl trimellitate suspension 50% solids.

Example A

A home washing machine set on "hot," full-cycle, for a small load (11 gallons of water) was used to launder samples of cured, resin-treated 50/50 polyester/cotton fabrics. (The fabrics had previously been washed 3 times to simulate used garments.) The fabrics were tan, light weight twill; navy blue heavy twill; and dark green heavy twill. At the start of the cycle 675 g. MAA/EA emulsion and 675 g. AA solution were added. After 40 minutes of subsequent tumble drying the samples, and other untreated ones, were spot soiled with motor oil, Wesson oil, 3-in-1 oil, melted butter, and used cranckcase oil. Next they were laundered with household detergent, dried, and evaluated against visual standards with a range of 1 to 5, 5 being optimum. The ten samples showed little improvement over the controls; the green fabrics were better, but rated only about 3; and the navy samples rated 3–4.

Example B

Similar samples were put into the same wash cycle with 675 g. MAA/EA emulsion and 270 g. AA solution, but with only the 14-minute normal wash cycle and no rinse cycle. Results of the same soiling and washing procedures as in Example A showed definite improvements for all three colors, but still ratings of only 3–3.5.

Example C

The wash procedure of Example 5 was repeated, with 675 g. MAA/EA emulsion, 270 g. AA solution, and 270 g. triisodecyl trimellitate suspension added at the beginning. The washing after soiling was greatly improved, the green and blue samples rating 5, and the tan ones 4. Similarly favorable results were obtained when samples of high tenacity polyester/cotton, Fortrel/cotton, and Dacron/cotton fabrics in a variety of colors and shades were similarly treated.

Example D

In typical applications to fabrics in commercial laundry equipment, immediately following completion of the final acid sour cycle, fabrics were slowly tumbled in each of the three formulations, A, B, or C, for 5 minutes at 110° F., the water was first drained and then spun off at 750 r.p.m. for one minute to reduce the water content to 20–30%, and finally the fabrics were hot-head pressed for 15 seconds at 310° F.

After overnight conditioning, the fabrics were spot stained with mineral oil and used cranckcase oil and washed again through a normal cycle, followed by press-drying, conditioning, and evaluation of residual staining. Average residual soil readings of from 4.4 to 4.8 were obtained, the best results being obtained with resin-finished polyester/cotton blends, the poorer with unfinished polyester fabrics. Comparable readings on fabrics not treated with soil release additives ran 1.5 to 2.3, total release being rated 5.0.

Example E

Samples of six fabrics were combined to make a total load of 16 pounds. The fabrics were washed in a normal white wash cycle at 140° F., and after the acid sour, 10 gallons of 140° F. water and 10 gallons of Formulation A were added. After tumbling for 8 minutes, the fabrics were drained, spun, and pressed as in Example D. After standard soiling and rewashing, the samples were evaluated and the ratings tabulated in Column 2 of Table 1. After another soiling and washing, the ratings were taken again and tabulated in Column 3.

TABLE 1.—SOIL RELEASE RATINGS FOR VARIOUS FABRICS TREATED WITH FORMULATION A

| Fabric | Rating | |
|---|---|---|
| | 1 wash | 2 washes |
| 65/35 polyester/cotton, unfinished | 4.9 | 4.6 |
| 65/35 polyester/cotton, finished | 4.8 | 4.8 |
| 100% cotton print, mercerized | 4.9 | 4.8 |
| 100% Type 54 spun Dacron | 4.9 | 3.8 |
| 100% Type 200 spun nylon | 4.9 | 4.9 |
| 100% Dacron tricot | 4.9 | 4.0 |

Our parent application also discloses improved soil release compositions which are applied to fabrics prior to laundering but in which the soil release characteristics are observed upon subsequent laundering. The following description is based almost entirely on the parent case, the entire disclosure of which is hereby incorporated by reference.

It has surprisingly been found that the combination of polyacrylic acid, in solution or emulsion forms, and other hydrophilic synthetic polymers results in a synergistic effect with outstanding soil release results. The effect is especially noticeable using polyacrylic acid with methacrylic acid/ethyl acrylate copolymer in amounts such that the polyacrylic acid is about 50% by weight of the copolymer. However, other proportions may also be used, for example 10–90% polyacrylic acid to 90–10% methacrylic acid/ethyl acrylate copolymer, as stated in the parent application, the water-absorbing polymer is one which absorbs at least about 550% by weight of water.

According to the invention, it also has been found that the following alkaline scours will give effective adhesion of the soil release finish and otherwise satisfactory results:

(a) Caustic scour with the caustic dissolved in water and in the presence of organic solvent such as xylene. Concentrations of the order of 2–15% NaOH, preferably 3–7%, and elevated temperatures up to the boil may be used (e.g. 200–212° F. for the aqueous scour). The time of treatment can be varied but generally will run in the area of 15–45 minutes, typically 30 minutes, the important requirement being that the fabric after treatment is characterized by instantaneous wetting with water. The treatment is usually accompanied by a fabric weight loss of from about 0.5% to 7% indicative, to some extent, of hydrolysis.

(b) Silicate scour using preferably 1 to 10% aqueous solutions of dry high alkalinity (pH 10 to 12) sodium silicates of the sesqui-, ortho- and/or meta-silicate types. This treatment is advantageously carried out at the boil for a period long enough to give a fabric that instantaneously wets with water, e.g. 30 minutes of treatment at the boil. This treatment gives even better results than the caustic scour even though weight losses are usually lower and run from 0 to 2.5% by weight.

It will be appreciated that, in the case of fabric scoured by caustic or silicate as noted above, the invention contemplates the possibility of using polyacrylic acid and the methacrylic acid-ethyl acrylate soil release polymers referred to earlier as the primary soil release finish, the scour pretreatment resulting in a 100% synthetic fabric which demonstrates much more durable and otherwise better soil release properties.

In lieu of the scouring pretreatment, the invention also contemplates using a mixture of polyacrylic acid and methacrylic acid-ethyl acrylate soil release polymers mentioned above for soil release purposes to produce a synergistic effect. As noted, while the combination of caustic or alkaline silicate scour and polyacrylic acid/polymer finish can be employed, there also can be used merely the combination of polyacrylic acid and methacrylic acid/ethyl acrylate copolymer which on conventionally scoured 100% synthetic fabric gives highly improved soil release and may be adequate in many instances.

In one embodiment, the invention involves impregnating a 100% synthetic fabric, advantageously but not necessarily after an alkaline scour as aforesaid, with an aqueous solution or dispersion of polyacrylic acid and a 60/40 copolymer of methacrylic acid and ether acrylate (referred to elsewhere herein for convenience as MAA/EA), a plasticizer and an additive. The monomer proportions in the copolymer may be higher or lower than indicated (e.g. from 20–90% methacrylic acid) but the 60/40 copolymer seems to offer optimum results in the usual case. A particularly preferred composition for impregnating the fabric (by padding, spraying or otherwise), comprises, on a weight basis, from 1–3% of the MAA/EA copolymer (60/40), 0.5% to 1.5% solids of 100% polyacrylic acid (e.g. K–702, B. F. Goodrich) and from 1.0% to 3% solids of an aqueous plasticizer emulsion of triisodecyl trimellitate (e.g. Moreflex 530, Pfizer), and 0.4 to 0.7% solids of Nopco D–602 additive (caprolactam-blocked urethane prepolymer containing a curing polyol). Usually the amount of polyacrylic acid solids is about 50% of the MAA/EA copolymer while the amount of plasticizer solids is normally about the same as the amount of MAA/EA.

The fabric may be in the wet or dry state when padded with the soil release composition. However, if processed in the wet state, the solids pickup should be at least twice that for dry cloth. The treatment of wet fabric has the advantage of saving the step of drying the fabric before application but care must be taken to evenly squeeze out excess moisture from the fabric to insure uniform pickup when the fabric is treated in the wet state.

The amount of the composition applied to the fabric can be widely varied and is dependent on such factors as the nature and construction of the fabric, its intended use, etc. Usually, however, wet pickup will fall in the range of 30–100% by weight of the fabric if the latter is initially in the dry state while pickup should be higher if the fabric is treated wet as aforesaid. After impregnation, this fabric is dried, usually at 190–300° F. for 1–5 minutes, and cured at 300–380° F. for a few seconds to 15 minutes. The drying procedure provides a degree of partial cure, usually about 25%, and forms at least some crosslinking in the soil release finish.

The invention in this aspect may be used to improve the soil release properties of various fabrics, preferably 100% synthetic fabric, e.g. knitted, woven, nonwoven or combinations thereof. It is of particular advantage in the case of fabrics made up entirely of polyester fibers although 100% nylon and acrylic fabrics or fabrics composed of blends of polyester, nylon, acrylic and/or other hydrophobic synthetic fibers may also be effectively processed according to the invention.

In the following examples, parts and/or percentages are on a weight basis in a water solution or dispersion. Soil release properties were determined in these examples by soiling the fabric specimens with black oil, mineral oil, clean motor oil and French dressing. After soiling, the specimens were washed in a home laundry agitator type top loading automatic washing machine set at 140° F. on the wash/wear cycle using a low sudsing detergent (e.g. "ADD," pH about 10). After washing a 35 minute total cycle on the wash-wear cycle, the specimens were tumble dried at 150–170° F. After conditioning, the specimens were placed on a black surface under a fluorescent light. The specimens were visually rated against a series of photographic standards with numerical ratings as follows:

Class 5—No staining
Class 4—Slight, but not appreciable staining
Class 3—Noticeable staining
Class 2—Very noticeable staining
Class 1—Very extreme staining In the examples given below, where data are shown for 10 or 20 launderings, the fabric specimen was laundered 9 or 19 times, respectively, stained and washed one time before rating. These extensive "prelaunderings" were used to determine durability of the soil release finish to repeated washing. In all examples, unless otherwise indicated, conventionally scoured fabrics were employed. The conventional or regular scouring procedure usually consists of scouring cloth at 203° F. for about ½ to one hour in an emulsifier or detergent to remove any oils or dirt. A typical procedure involves: 0.13% Hipochem ST (a phosphate ester made by High Point Chemical Co.) emulsifier and 0.02% Hipoquest ST (tetra sodium salt of ethylene diamine tetraacetic acid made by High Point Chemical Co.) sequestrant.

Example 1

(A) A 100% Dacron tricot was padded with an aqueous dispersion (8% solids) of methacrylic acid/ethyl acrylate copolymer (60/40), dried for two minutes at 200° F. and then cured at 350° F. for two minutes.

(B) The procedure of paragraph (A) was repeated on a similar 100% Dacron tricot using an aqueous solution (8% solids) of polyacrylic acid.

(C) The procedure of paragraph (A) was repeated using an aqueous dispersion of polyacrylic acid (5% solids) and 3% solids methacrylic acid/ethyl acrylate copolymer.

The thus treated fabric specimens (approximately 75% wet pickup in each case) were then soiled and tested for soil removal. The following results were obtained (after 10 launderings):

|  | Black oil | Mineral oil | Clean motor oil | French dressing |
|---|---|---|---|---|
| Treatment: | | | | |
| A | 2.5 | 5 | 5 | 5 |
| B | 3.0 | 4 | 3 | 4 |
| C | 4.0 | 5 | 5 | 5 |

This shows the synergistic effect obtained with the combination of polyacrylic acid and MAA/EA copolymer in durability of finish and soil release, it being noted that only 3% MAA/EA is used with 5% polyacrylic acid in Treatment C and the results of this treatment are as good as, or better than, Treatment A where 8% MAA/EA is used and much better than Treatment B where 8% polyacrylic acid is used.

Example 2

(A) 100% Dacron tricot was padded with an aqueous 1% (solids) dispersion of the methacrylic acid/ethyl acrylate copolymer used in Example 1 and left wet (i.e. the drying and curing of Example 1 were omitted);

(B) Paragraph (A) of this example was repeated except that a 1% solution of polyacrylic acid was used in lieu of the copolymer, the fabric being left wet;

(C) Paragraph (A) of this example was repeated except that the pad comprised 1% (solids) of the copolymer and 1% solids polyacrylic acid, the fabric being left wet.

The wet fabric specimens were all exposed to vapors of steam and ammonia (600 cc. NH$_4$OH in 20 gals. water) at approximately 190° F. for 5 minutes, dried 2 minutes at 200° F. and cured 2 minutes at 350° F.

On testing for stain removal of black oil as in Example 1, the following results were obtained after 10 launderings:

| Treatment | Rating |
|---|---|
| A | 3 |
| B | 1 |
| C | 4 |

These results show the improvement obtaining from the combination of (1) MAA/EA copolymer and polyacrylic acid for the finish and (2) ammonia vapor treatment.

Example 3

Example 1 was repeated using bar on bar tricot fabric composed of 57% T-57 Dacron and 43% nylon and the following pad composition:

A. 1% solids MAA/EA copolymer in water
B. 1% solids AA in water
C. 1% solids AA plus 1% solids MAA/EA copolymer in water.

As will be recognized, the abbreviations "MAA/EA" and "AA" have been used above and are employed elsewhere herein, for convenience, to designate, respectively, the 60/40 methacrylic acid/ethyl acrylate copolymer and polyacrylic acid.

The results of stain removal after ten launderings were as follows:

| | Black oil | Mineral oil | Clean motor oil | French dressing |
|---|---|---|---|---|
| Treatment: | | | | |
| A | 2.5 | 4.5 | 3.0 | 4.5 |
| B | 1.0 | 2.5 | 2.5 | 2.5 |
| C | 4.0 | 5.0 | 5.0 | 5.0 |
| Untreated | 1.0 | 2.5 | 1.0 | 1.0 |

Here again, the improvement resulting from the combined use of MAA/EA and AA is to be noted. It should also be noted that the ratings of the untreated fabrics used in this example apply to the other examples which use the same fabric and the same scour.

Example 4

(A) A bar on bar tricot composed of 57% T-57 Dacron/43% nylon was padded with 0.5% solids AA, 0.5% solids MAA/EA, and 2.0% solids emulsified TIDTM in water and left wet.

(B) Paragraph (A) of this example was repeated on another similar fabric using a pad of 0.5% solids AA, 1.0% solids MAA/EA, and 2.0% solids emulsified TIDTM in water.

(C) Paragraph (A) of this example was repeated using a pad of 1.0% solids MAA/EA, plus 2.0% solids emulsified TIDTM in water.

The "TIDTM" referred to above was an emulsion of Morflex 530 (triisodecyl trimellitate).

All of the fabric specimens were exposed while wet to vapors of steam and ammonia (600 cc. NH₄OH per 20 gals. water) at approximately 190° F. for two minutes, dried 2 minutes at 200° F. and cured 2 minutes at 350° F.

The results of stain removal (10 launderings) are given below:

| | Black oil | Clean motor oil |
|---|---|---|
| Treatment: | | |
| A | 2.5 | 3.0 |
| B | 4.0 | 5.0 |
| C | 3.0 | 5.0 |

In the above example, the TIDTM functioned to improve hand while it will be noted that better soil release was attained with Treatment (B) using the higher total solids of MAA/EA plus AA vs. Treatment (A). The ratio of 50% AA on the weight of the MAA/EA to produce a synergistic effect is also noted in Treatment (B).

Example 5

(A) 100% Dacron tricot was padded with the following composition:

1% solids MAA/EA, 0.5% solids AA and
1% solids emulsified TIDTM (B) A similar fabric was padded with the following composition:

1% solids MAA/EA, 0.5% solids AA and
1% solids phenyl stearic acid

Both fabrics were scoured before application of soil release with 3% NaOH solution at 180° F., 15 minutes (2.5% weight loss) rinsed, neutralized in 1% acetic acid, rinsed, dried 2 minutes at 200° F.

Both fabrics, after padding with the indicated soil release compositions, were dried 2 minutes at 200° F. and cured 45 seconds at 380° F.

Results of stain removal (10 launderings) were as follows:

| | Black oil | Mineral oil | Clean motor oil | French dressing |
|---|---|---|---|---|
| Treatment: | | | | |
| A | 4 | 5 | 5 | 5 |
| B | 3 | 4.5 | 5 | 4.5 |

The TITDM and phenyl stearic acid used in this example gave the fabric a softer hand. In both instances the soil release was good, it being noted that black oil is an extremely severe test soil.

Example 6

Fabric: 57% T-57 Dacron/43% Nylon bar on bar tricot.
Procedures:
A. Caustic scoured as in Example 5, then padded with 1% solids MAA/EA, 0.5% solids AA and 1% solids emulsified TIDTM in water.
B. Same as A except no caustic scour.

Results of stain removal, 10 launderings.

| | Black oil | Mineral oil | Clean motor oil | French dressing |
|---|---|---|---|---|
| Treatment: | | | | |
| A | 4.0 | 4.0 | 5.0 | 4.0 |
| B | 3.0 | 4.0 | 3.0 | 4.0 |

This example shows the advantage of caustic scour before treatment with the soil release finish.

Example 7

Fabric: 57% T-57 Dacron/43% Nylon bar on bar tricot.
Procedures:
A. Scour for 30 minutes at 203° F. in 10% solids solution in water of anhydrous sodium metasilicate, rinsed, neutralized in 2% acetic acid at room temperature, rinsed and dried 2 minutes at 200° F.
B. Regular scour.

The fabrics obtained by scouring procedures A and B were both padded with 1% solids MAA/EA plus 0.5% solids AA and 1% solids emulsified TIDTM, dried 2 minutes at 250° F. and cured 45 seconds at 380° F.

Results of stain removal after 1, 10 and 15 launderings were as follows:

| | Black oil | | | Mineral oil | | | Motor oil | | | Dressing | | |
|---|---|---|---|---|---|---|---|---|---|---|---|---|
| | 1 | 10 | 15 | 1 | 10 | 15 | 1 | 10 | 15 | 1 | 10 | 15 |
| Treatment: | | | | | | | | | | | | |
| A | 4.5 | 3.0 | 4.0 | 5.0 | 4.5 | 4.5 | 5.0 | 5.0 | 5.0 | 5.0 | 4.5 | 4.0 |
| B | 3.0 | 2.5 | 2.5 | 5.0 | 4.0 | 4.0 | 5.0 | 4.0 | 3.0 | 5.0 | 4.0 | 3.0 |

What is claimed is:

1. A process of washing textile fabrics to obtain improved soil release properties comprising washing them in a composition which is an aqueous dispersion consisting essentially of (1) a hydrophilic, water dispersible copolymer of methacrylic acid and ethyl acrylate which absorbs at least 550% of water (2) a water-soluble polyacrylic acid and (3) water, the proportions of (1) to (2) being from 90–10% to 10–90%.

2. A process according to Claim 1 wherein the methacrylic acid-ethyl acrylate copolymer contains 60–65% methacrylic acid and 40–35% ethyl acrylate and the fabrics are a member of the group consisting of rayon, nylon, polyacrylonitrile, wool, cotton and polyester fabrics.

3. A process according to Claim 2 wherein the methacrylic acid-ethyl acrylate copolymer contains 60% methacrylic acid and 40% ethyl acrylate.

4. A process of washing textile fabrics to obtain improved soil release properties comprising washing them in a composition which is an aqueous dispersion consisting essentially of water and (a) 2 to 8 parts of a hydrophilic, water dispersible copolymer of methacrylic acid and ethyl acrylate which absorbs at least 550% of water, 1 to 4 parts of water-soluble polyacrylic acid and 2 to 8 parts of a higher trialkyl trimellitate or (b) 2 to 8 parts of water dispersible methacrylic acid-ethyl acrylate copolymer which absorbs at least 550% of water, 1 to 4 parts of polyacrylic acid, 2 to 8 parts of higher trialkyl trimellitate and 7.5 to 30 parts of a durable press textile reactant selected from the group consisting of formaldehyde, water-soluble precondensates of formaldehyde with an amino compound and blocked isocyanates, all parts being by weight.

5. A process according to Claim 4 wherein the methacrylic acid-ethyl acrylate copolymer contains 60–65% methacrylic acid and 40–35% ethyl acrylate.

6. A process according to Claim 5 wherein the methacrylic acid-ethyl acrylate copolymer contains 60% methacrylic acid and 40% ethyl acrylate.

7. A process according to Claim 4 wherein the composition is composition (a) and contains 4 parts of the copolymer, 2 parts of the polyacrylic acid and 4 parts of the trimellitate.

8. A process according to Claim 4 wherein the parts by weight are in pounds and the water is present in an amount of 50 gallons.

9. A process according to claim 4 wherein the textile fabrics include a member of the group consisting of rayon, nylon, polyacrylonitrile, wool, cotton and polyester fabrics.

10. A process according to Claim 4 wherein the composition contains 2 to 8 pounds of copolymer, 1 to 4 pounds of polyacrylic acid and the water is present in an amount of 50 gallons.

11. A process according to Claim 4 wherein the textile fabrics include a member of the group consisting of cellulosic fabrics, polyester fabrics and cellulose-polyester fabrics.

12. A process according to Claim 11 wherein the composition is composition (a).

13. A process according to Claim 4 wherein the composition is composition (a).

14. A process according to Claim 13 wherein the trimellitate is triisodecyl trimellitate.

References Cited

UNITED STATES PATENTS

| | | | |
|---|---|---|---|
| 3,632,422 | 1/1972 | Maggiolo et al. | 117—138.8 F |
| 3,377,249 | 4/1968 | Marco | 117—139.5 A |
| 2,987,521 | 6/1961 | Hughes | 117—139.5 A |
| 3,265,529 | 8/1966 | Caldwell | 117—139.5 A |
| 2,936,249 | 5/1960 | Hennemann et al. | 117—139.5 A |
| 3,206,328 | 9/1965 | Shaw et al. | 117—139.5 A |
| 2,987,514 | 6/1961 | Hughes et al. | 117—139.5 A |
| 2,725,308 | 11/1955 | Nickerson | 117—161 UP |
| 2,731,364 | 1/1956 | Reibnitz et al. | 117—161 UP |
| 2,755,198 | 7/1956 | Stewart | 117—139.5 A |
| 2,807,865 | 10/1957 | Shippee et al. | 117—161 UP |
| 2,923,646 | 2/1960 | Jordon | 117—161 UP |
| 2,949,386 | 8/1960 | Cassel | 117—161 UP |
| 2,987,421 | 6/1961 | Sherwood | 117—161 UP |
| 3,011,917 | 12/1961 | Dreibach et al. | 117—139.5 A |
| 3,193,446 | 7/1965 | Eisenberg | 117—155 UP |
| 3,236,685 | 2/1966 | Caldwell et al. | 117—161 UP |
| 3,650,801 | 3/1972 | Hinton et al. | 117—139.94 |

WILLIAM D. MARTIN, Primary Examiner

W. R. TREVOR, Assistant Examiner

U.S. Cl. X.R.

8—111.6; 117—138.8 N, 138.8 UA, 138.4, 139.5 A, 141, 143 A, 161 UC, 161 UE, 161 LN

UNITED STATES PATENT OFFICE
CERTIFICATE OF CORRECTION

Patent No. 3,824,125            Dated July 16, 1974

Inventor(s) Everett H. Hinton, Jr. & Larry E. Avery

It is certified that error appears in the above-identified patent and that said Letters Patent are hereby corrected as shown below:

Column 2, line 15, change "trimethllitate" to --trimellitate--;

line 46, change "preefrably" to --preferably--.

Column 3, line 36, change "cranckcase" to --crankcase--;

line 52, change "5" to --B--.

Column 4, line 44, change ", as" to --. As--.

Column 5, line 20, change "ether" to --ethyl--.

Signed and sealed this 19th day of November 1974.

(SEAL)
Attest:

McCOY M. GIBSON JR.          C. MARSHALL DANN
Attesting Officer            Commissioner of Patents